United States Patent [19]

Wilson

[11] Patent Number: 4,600,089
[45] Date of Patent: Jul. 15, 1986

[54] TRAILER HYDRAULIC BRAKE SYSTEM

[76] Inventor: Bill Wilson, P.O. Box 25, Lutz, Fla. 33549

[21] Appl. No.: 714,033

[22] Filed: Mar. 20, 1985

[51] Int. Cl.$^4$ .............................................. B60T 7/20
[52] U.S. Cl. ............................ 188/112 R; 280/446 R
[58] Field of Search ................. 188/3 R, 3 H, 112 R; 280/446 R; 180/282

[56] References Cited

U.S. PATENT DOCUMENTS

| | | | |
|---|---|---|---|
| 3,404,757 | 10/1968 | Beach et al. | 188/112 |
| 3,570,633 | 3/1971 | Garnett | 188/112 |
| 4,082,168 | 4/1978 | Cole et al. | 188/112 |

FOREIGN PATENT DOCUMENTS

| | | | |
|---|---|---|---|
| 967613 | 5/1975 | Canada | 188/112 |

Primary Examiner—George E. A. Halvosa
Attorney, Agent, or Firm—Arthur W. Fisher, III

[57] ABSTRACT

A trailer hydraulic brake system is used with a gooseneck trailer and truck combination. The system includes a frame configured to operatively mount the trailer hydraulic brake system on the gooseneck trailer, a brake actuator including a first and second brake actuator member each pivotally attached to the frame, a brake mechanism including a forward and reverse brake mechanism each pivotally coupled to the first brake actuator member, a brake mechanism positioner selectively movable between a forward and reverse position to selectively engage the forward or reverse brake mechanism and a hydraulic master cylinder coupled to the trailer brakes attached to the frame. The hydraulic master cylinder is disposed to engage the second brake actuator member such that when the brake mechanism positioner is in the forward position the forward brake mechanism engages the second brake actuator member whereby as the truck is stopped the first and second brake actuator members pivot in the same direction to actuate the hydraulic master cylinder to brake the gooseneck trailer and such that when the brake mechanism positioner is in the reverse position the reverse brake mechanism engages the second brake actuator member whereby as the truck is stopped the first and second brake actuator members pivot in the opposite direction to actuate the hydraulic master cylinder to brake the gooseneck trailer.

26 Claims, 5 Drawing Figures

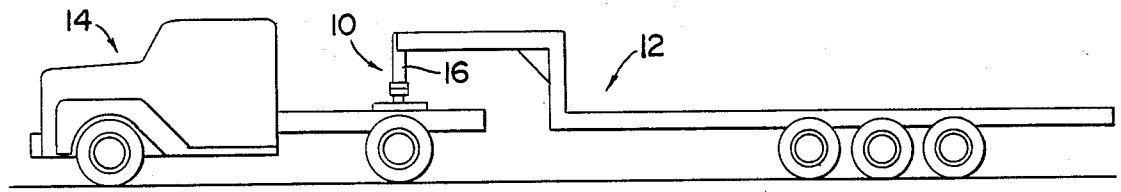
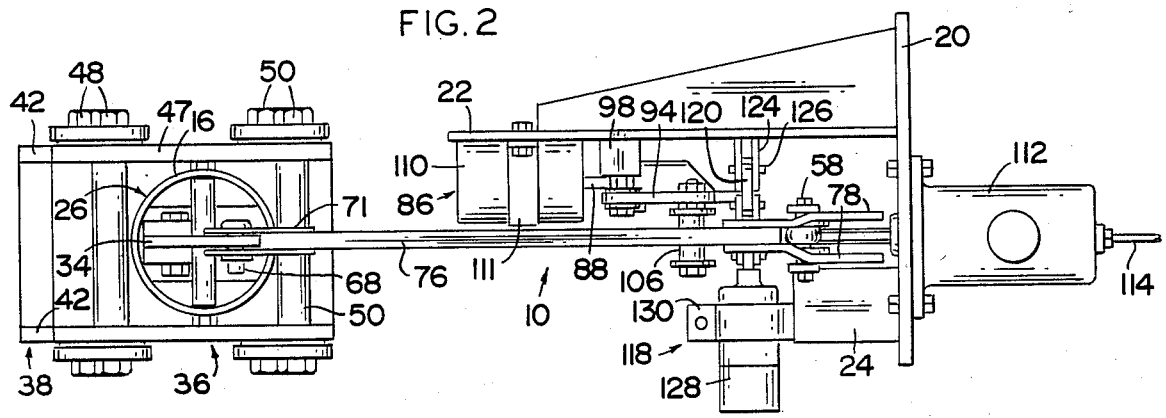
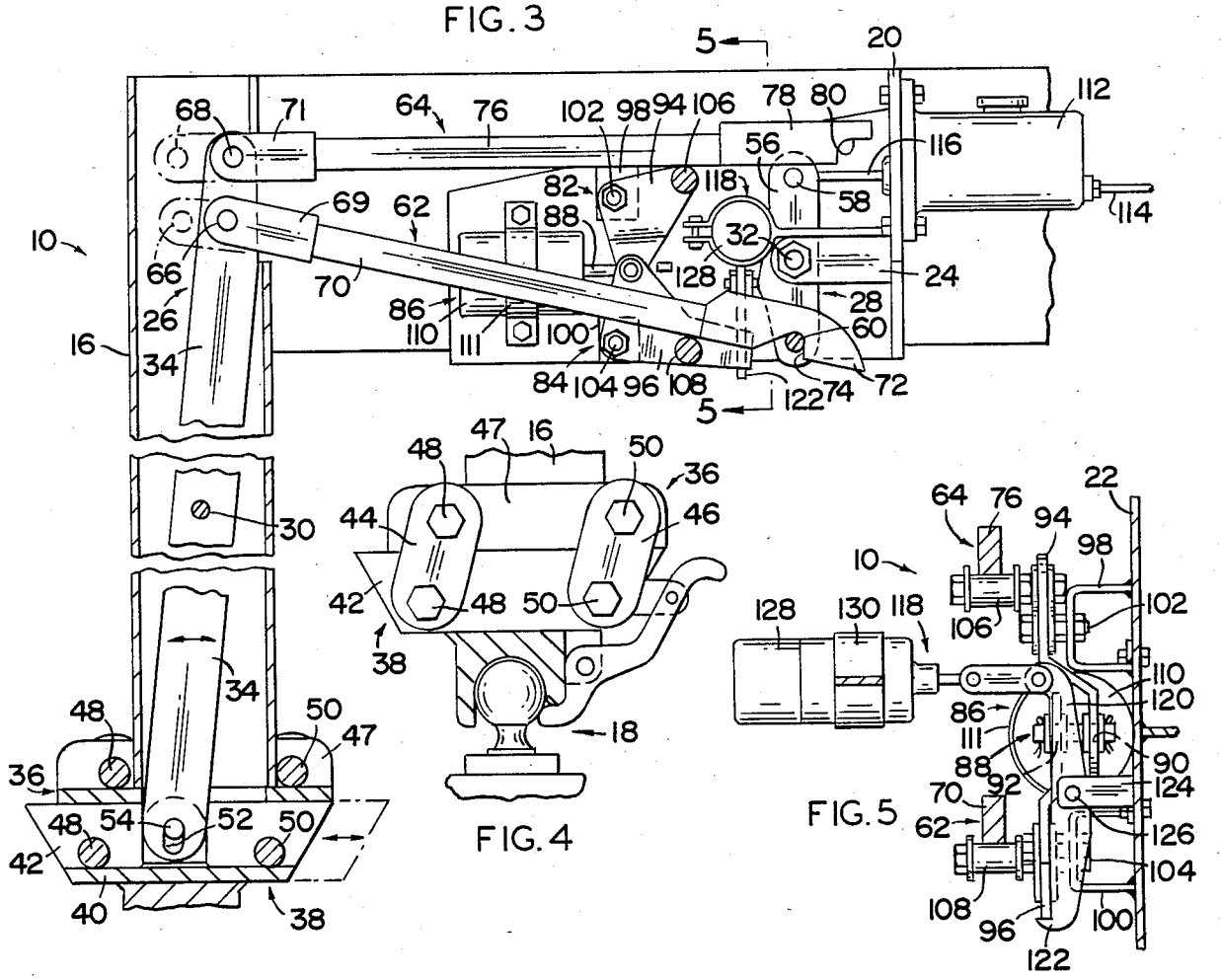

TRAILER HYDRAULIC BRAKE SYSTEM

BACKGROUND OF THE INVENTION

1. Field of the Invention

A trailer hydraulic brake system for use with a gooseneck trailer and truck combination.

2. Description of the Prior Art

Numerous gooseneck trailer structures have been developed to improve the load handling characteristics of trucks when pulling a trailer.

While various auxiliary systems are available, unfortunately such trailer and truck combinations do not have adequate trailer brake systems.

Peterson, U.S. Pat. No. 3,941,408 shows a mechanism for connecting and disconnecting the service lines of a tractor-trailer while Fowler, U.S. Pat. No. 3,630,575 discloses a tractor for a coupling between the brake system of the tractor and trailer using an auxiliary piston and cylinder.

Camey, U.S. Pat. No. 4,423,885 discloses a trailer assembly provided with means to lower the trailer platform to the ground where the gooseneck may be detached from the platform to facilitate loading. Yakubor, U.S. Pat. No. 3,866,947 shows a similar device.

James, U.S. Pat. No. 3,419,169 shows a power actuated folding gooseneck trailer while Gee, U.S. Pat. No. 3,913,948 shows a conversion arrangement for a dump truck.

Additional examples of the prior art are found in: U.S. Pat. Nos. 2,689,137; 2,944,834; 3,181,761; 3,254,900; 3,321,215; 3,536,340; 3,677,563; 3,706,464; 4,208,163; 4,377,296 and 4,400,005.

SUMMARY OF THE INVENTION

The present invention relates to a trailer hydraulic brake system for use with a gooseneck trailer and truck combination.

The trailer hydraulic brake system comprises a frame to operatively mount a brake actuator, a brake mechanism, a brake mechanism positioner and a hydraulic master cylinder to the gooseneck trailer.

More specifically the frame comprises a hollow forward frame member detachably coupling the gooseneck trailer to the truck in any conventional means and a lateral base plate having a longitudinal mounting plate and longitudinal attachment plates extending outwardly from the front surface thereof.

The brake actuator comprises a first and second brake actuator member pivotally attached to the hollow forward frame member and the attachment plates respectively. The first brake actuator member comprises an elongated flat brake actuator element while the second brake actuator member comprises a flat brake actuator element having a upper and lower engagement element extending through opposite end portions thereof.

The brake mechanism comprises a forward and reverse brake mechanism pivotally coupled to the elongated flat brake actuator element. The forward and reverse brake mechanism each comprises a flat elongated brake member having a pair of parallel brake elements formed on the end portion thereof. Each brake element includes an engagement surface to selectively engage the surfaces of opposite end portions of the lower and upper engagement elements as described more fully hereinafter.

The brake mechanism positioner comprises an upper and lower brake positioner operatively coupled to a brake mechanism positioner actuator by an interconnecting element through attachment slots formed therein. The upper and lower brake positioners are pivotally coupled to the longitudinal mounting plate by an upper and lower pivot elements respectively. An upper and lower support element or roller are mounted on the upper and lower brake positioners respectively to selectively engage the flat elongated reverse and forward brake member respectively as described more fully hereinafter. The brake mechanism positioner actuator comprises a solenoid or similar two position device attached to the longitudinal mounting plate.

The hydraulic master cylinder attached to the lateral base plate is coupled to the trailer brakes. An actuator plunger member is operatively coupled to the hydraulic master cylinder to selectively engage the flat brake actuator element as described more fully hereinafter.

When positioned to operate in the forward direction the forward brake mechanism is disposed such that the engagement surfaces thereof engage opposite sides of the lower engagement element. Thus, when the truck is braked, the elongated flat brake actuator element rotates pulling the forward brake mechanism forward causing the flat brake actuator element to rotate clockwise to operatively engage the actuator plunger member moving the actuator plunger member rearwardly actuating the hydraulic master cylinder to brake or slow the trailer.

To operate in the reverse direction, the brake mechanism positioning actuator is placed in the reverse position by any conventional remote means retracting the innerconnecting element causing the upper brake positioner to rotate downwardly permitting the engagement surfaces of the reverse brake mechanism to operatively engage opposite sides of the upper engagement element while rotating the lower brake positioner upwardly moving the engagement surfaces of the forward brake mechanism out of operative engagement with opposite sides of the lower engagement element.

Thus, prepared to operate in the reverse position, when the truck is braked the elongated flat brake actuator element rotates clockwise causing the upper engagement surfaces of the reverse brake mechanism to push against opposite sides of the upper engagement element moving the flat brake actuator element clockwise to actuate the actuator plunger member of the hydraulic master cylinder to effect braking of the trailer.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a fragmented side view of a trailer and truck combination.

FIG. 2 is a detailed top view of the trailer hydraulic brake system.

FIG. 3 is a detailed side of the trailer hydraulic brake system.

FIG. 4 is a detailed partial side view of the lower support slide mechanism.

FIG. 5 is a partial end view of the trailer hydraulic brake system taken along line 5—5 of FIG. 3.

Similar reference characters refer to simlar parts throughout the several views of the drawing.

DETAILED DESCRIPTION OF THE PREFERRED EMBODIMENT

As shown in FIGS. 1 through 3, the present invention relates to a trailer hydraulic brake system generally indicated as 10 for use with a gooseneck trailer and truck combination generally indicated as 12 and 14 respectively.

As best shown in FIGS. 2 and 3, the trailer hydraulic brake system 10 comprises a frame to operatively mount a brake actuator, a brake mechanism, a brake mechanism positioner and a hydraulic master cylinder to the gooseneck trailer 12.

More specifically the frame comprises a substantially vertical hollow forward frame member 16 detachably coupling the gooseneck trailer 12 to the truck 14 in any conventional means as shown at 18 and a substantially vertical lateral base plate 20 having a substantially vertical longitudinal mounting plate 22 and substantially vertical longitudinal attachment plates each indicated as 24 extending outwardly from the front surface thereof.

The brake actuator comprises a first and second brake actuator member generally indicated as 26 and 28 respectively pivotally attached to the substantially vertical hollow forward frame member 16 and the pair of parallel substantially vertical longitudinal attachment plates 24 respectively by a first and second pivot element indicated as 30 and 32 respectively. The first brake actuator member 26 comprises an elongated flat brake actuator element 34 coupled to a lower support slide mechanism generally indicated as 36. The lower support slide mechanism 36 comprises a slide block 38 including a substantially horizontal slide base 40 having a pair of parallel substantially vertical slide plates each indicated as 42 extending upwardly therefrom. A pair of forward and rear substantially vertical coupling plates indicated as 44 and 46 respectively are coupled between the pair of parallel substantially vertical slide plates 42 and a pair of parallel substantially vertical upper stationary plates each indicated as 47 by a pair of forward and rear pivot elements 48 and 50 respectively. A slot 52 is formed in the lower portion of the elongated flat brake actuator element 34 to rotatably couple the elongated flat brake actuator element 34 to the pair of parallel substantially vertical slide plates 42 of the slide block 38 by a slide pivot element 54. The second brake actuator member 28 comprises a substantially vertical flat brake actuator element 56 having a substantially horizontal upper and lower engagement element indicated as 58 and 60 respectively extending through opposite end portions thereof.

The brake mechanism comprises a forward and reverse brake mechanism generally indicated as 62 and 64 respectively pivotally coupled to the elongated flat brake actuator element 34 by a first and second pivot element indicated as 66 and 68 respectively. A first and second support collar indicated as 69 and 71 respectively support the forward portion of the forward and reverse brake mechanism 62 and 64 adjacent elongated flat brake actuator element 34. The forward brake mechanism 62 comprises a flat elongated forward brake member 70 having a pair of parallel forward brake elements each indicated as 72 formed on the end portion thereof. Each forward brake element 72 includes a lower engagement surface 74 to selectively engage the rear surfaces of opposite end portions of the lower substantially horizontal engagement element 60 as described more fully hereinafter. The reverse brake mechanism 64 comprises a flat elongated reverse brake member 76 having a pair of parallel reverse brake elements each indicated as 78 formed the end portion thereof. Each reverse brake element 78 includes an upper engagement surface 80 to selectively engage the forward surfaces of opposite end portions of the upper substantially horizontal engagement element 58 as described more fully hereinafter.

The brake mechanism positioner comprises an upper and lower brake positioner generally indicated as 82 and 84 respectively operatively coupled to a brake mechanism positioner actuator 86 by a T-shaped interconnecting element 88 through attachment slots 90 and 92 respectively formed in an upper and lower angular positioner plate 94 and 96 respectively. The upper and lower angular positioner plate 94 and 96 are pivotally coupled to the substantially vertical longitudinal mounting plate 22 by upper and lower substantially U-shaped mounting brackets indicated as 98 and 100 respectively and upper and lower pivot elements indicated as 102 and 104 respectively. An upper and lower support element or roller indicated as 106 and 108 respectively are mounted on the upper and lower angular positioner plate 94 and 96 respectively to selectively engage the flat elongated reverse brake member 76 and flat elongated forward brake member 70 as described more fully hereinafter. The brake mechanism positioner actuator 86 comprises a solenoid or similar two position device 110 attached to the substantially vertical longitudinal mounting plate 22 by a mounting bracket 111.

The hydraulic master cylinder 112 attached to the substantially vertical lateral base plate 20 is coupled to the trailer brakes (not shown) by brake fluid line 114. An actuator plunger member 116 is operatively coupled to the hydraulic master cylinder 112 to selectively engage the substantially vertical flat brake actuator element 56 as described more fully hereinafter.

A lock mechanism generally indicated as 118 may be provided to normally secure the trailer hydraulic brake system in the reverse position. The lock mechanism 118 comprises a lock member 120 including a lower lock element 122 pivotally attached to lock bracket 124 by pivot element 126. A lock actuator 128 is coupled to the upper portion of the lock member 120. As shown in FIG. 5, the lower lock element 122 engages the lower angular positioner plate 96 when the lock actuator 128 is in the lock position to maintain the forward brake mechanism 62 in the disengaged position. The lock actuator 128 comprises a solenoid or similar two position device attached to the substantially vertical longitudinally mounting plate 22 by a mounting bracket 130.

The solid lines show the trailer hydraulic brake system 10 positioned to operate in the forward direction while the phantom lines show the trailer hydraulic brake system 10 positioned to operate in the reverse direction. Specifically, the elongated flat brake actuator element 34 is disposed such that the lower engagement surfaces 74 of the flat elongated forward brake member 70 engage opposite sides of the substantially horizontal lower engagement element 60. The T-shaped innerconnecting element 88 is in the forward or extended position. Thus, when the truck 14 is braked, the elongated flat brake actuator element 34 rotates counter clockwise pulling the elongated forward brake member 70 forward causing the substantially vertical flat brake actuator element 56 to rotate clockwise to operatively engage the actuator plunger member 116 moving the actuator plunger member 116 rearwardly actuating the hydraulic master cylinder 112 to brake or slow the trailer 12.

To operate in the reverse direction, the brake mechanism positioning actuator 86 is placed in the reverse position by any conventional remote means retracting the T-shaped innerconnecting element 88 causing the upper angular positioner plate 94 to rotate downwardly permitting the upper engagement surfaces 80 to operatively engage opposite sides of the substantially horizontal upper engagement element 58 while rotating the lower angular positioner plate 96 upwardly moving the lower engagement surface 74 out of operative engagement with opposite sides of the substantially horizontal lower engagement element 60 as shown in the phantom lines.

When moving the upper and lower angular positioner plates 94 and 96, the rollers or upper and lower support elements 106 and 108 facilitate movement of the forward and reverse flat elongated brake members 70 and 76. Thus, prepared to operate in the reverse position, when the truck 14 is braked the elongated flat brake actuator element 34 rotates clockwise causing the upper engagement surfaces 80 to push against opposite sides of the substantially horizontal upper engagement element 58 moving the substantially vertical flat brake actuator element 56 clockwise to actuate the actuator plunger member 116 of the hydraulic master cylinder 112 to effect braking of the trailer 12.

The flat elongated forward brake member 70 is held in the position shown in the phantom line by lock mechanism 118 when operating in the reverse direction. To return the trailer hydraulic brake system to the forward position, the lock mechanism 118 is released by actuation of the lock control 120 by an suitable remote means.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A trailer hydraulic brake system for use with a gooseneck trailer and truck combination comprising a frame configured to operatively mount said trailer hydraulic brake system on the gooseneck trailer, a brake actuator including a first and second brake actuator member each pivotally attached to the frame, a brake mechanism including a forward and reverse brake mechanism each pivotally coupled to the first brake actuator member, a brake mechanism positioner selectively movable between a forward and reverse position to selectively engage the forward or reverse brake mechanism and a hydraulic master cylinder coupled to the trailer brakes attached to the frame, said hydraulic master cylinder being disposed to engage said second brake actuator member such that when said brake mechanism positioner is in said forward position said forward brake mechanism engages said second brake actuator member whereby as the truck is stopped said first and second brake actuator member pivot in the same direction to actuate said hydraulic master cylinder to brake the gooseneck trailer and such that when said brake mechanism positioner is in said reverse position said reverse brake mechanism engages said second brake actuator member whereby as the truck is stopped said first and second brake actuator pivot in the opposite direction to actuate said hydraulic master cylinder to brake the gooseneck trailer.

2. The trailer hydraulic brake system of claim 1 wherein said first brake actuator member comprises an elongated brake actuator element pivotally coupled to the forward portion of said frame by a first pivot element.

3. The trailer hydraulic brake system of claim 2 wherein said elongated brake actuator element is operatively coupled to a lower support slide mechanism to support said elongated brake actuator element.

4. The tralier hydarulic brake system of claim 3 wherein said lower support slide mechanism comprises a slide block having a substantially horizontal slide base having a pair of parallel substantially vertical slide plates extending upwardly therefrom and a pair of forward and rear substantially vertical coupling elements coupled to said pair of parallel substantially vertical slide plates by a pair of forward and rear pivot elements.

5. The trailer hydraulic brake system of claim 4 wherein said elongated brake actuator element further includes a slot formed in the lower portion thereof to rotatably couple said elongated brake actuator element to said pair of parallel substantially vertical slide plates by a slide pivot element.

6. The trailer hydraulic brake system of claim 1 wherein said second brake actuator member comprises a flat brake actuator element having an upper and lower engagement element extending through opposite end portions thereof to selectively support said forward and reverse brake mechanisms respectively.

7. The trailer hydraulic brake system of claim 1 wherein said forward brake mechanism comprises an elongated forward brake member pivotally attached to said first brake actuator member by a first pivot element.

8. The trailer hydraulic brake system of claim 7 wherein said forward brake mechanism further includes a first support collar coupled to said first brake actuator member to support the forward portion of said elongated forward brake member adjacent said first brake actuator member.

9. The trailer hydraulic brake system of claim 8 wherein said forward brake mechanism further includes a pair of parallel forward brake elements extending outwardly from the rear portion of said elongated forward brake member to selectively engage said second brake actuator member.

10. The trailer hydraulic brake system of claim 9 wherein each of said pair of parallel forward brake elements includes a cut out portion forming a lower engagement surface to selectively engage said second brake actuator member.

11. The trailer hydraulic brake system of claim 1 wherein said reverse brake mechanism comprises an elongated reverse brake member pivotally attached to said first brake actuator member by a second pivot element.

12. The trailer hydraulic brake system of claim 11 wherein said reverse brake mechanism further includes a second support collar coupled to said first brake actuator member to support the forward portion of said elongated reverse brake member adjacent said first brake actuator member.

13. The trailer hydraulic brake system of claim 12 wherein said reverse brake mechanism further includes a pair of parallel reverse brake elements extending outwardly from the rear portion of said elongated reverse brake member to selectively engage said second brake actuator member.

14. The trailer hydraulic brake system of claim 13 wherein each of said pair of parallel reverse brake elements includes a cut out portion forming a lower engagement surface to selectively engage said second brake actuator member.

15. The trailer hydraulic brake system of claim 1 wherein said brake mechanism positioner comprises an upper and lower brake positioner operatively coupled to a brake mechanism positioner actuator by an innerconnecting element, said brake mechanism positioner actuator movable between a forward and reverse position to selectively move said upper and lower brake positioner in selective engagement with said forward and reverse brake mechanism respectively.

16. The trailer hydraulic brake system of claim 15 wherein said upper brake positioner comprises an upper positioner plate including an attachment slot to operatively receive a portion of said innerconnecting elements and an upper pivot element to pivotally couple said upper positioner plate to the rear portion of said frame.

17. The trailer hydraulic brake system of claim 16 wherein said upper brake positioner further includes an upper support element to selectively engage said reverse brake mechanism.

18. The trailer hydraulic brake system of claim 17 wherein said upper support element comprises a roller.

19. The trailer hydraulic brake system of claim 15 wherein said lower brake positioner comprises a lower positioner plate including an attachment slot to operatively receive a portion of said innerconnecting element and a lower pivot element to pivotally couple said lower positioner plate to the rear portion of said frame.

20. The trailer hydraulic brake system of claim 19 wherein said lower brake positioner further includes a lower support element to selectively engage said forward brake mechanism.

21. The trailer hydraulic brake system of claim 20 wherein said lower support element comprises a roller.

22. The trailer hydraulic brake system of claim 15 wherein said innerconnecting element comprises a substantially T-shaped innerconnecting element operatively coupled to said upper and lower brake positioner.

23. The trailer hydraulic brake system of claim 1 wherein said hydraulic master cylinder is coupled to the rear portion of said frame having an actuator plunger member extending outwardly thereof to selectively engage said second brake actuator member.

24. The trailer hydraulic brake system of claim 1 further including a lock mechanism to selectively engage said forward brake mechanism when said brake mechanism positioning actuator is in said reverse position.

25. The trailer hydraulic brake system of claim 24 wherein said lock mechanism comprises a lock member including a lower lock element mounted on said movable frame between a locked and unlocked position to selectively engage said forward brake mechanism in said forward position when in said locked position.

26. The trailer hydraulic brake system of claim 25 wherein said lock mechanism further includes a lock actuator coupled to said lock member to selectively move said lock member between said locked and unlocked position.

* * * * *